June 26, 1962  B. I. ULINSKI  3,040,827
DRIVE STEERING FOR INDUSTRIAL TRUCK
Filed May 9, 1960  5 Sheets-Sheet 1
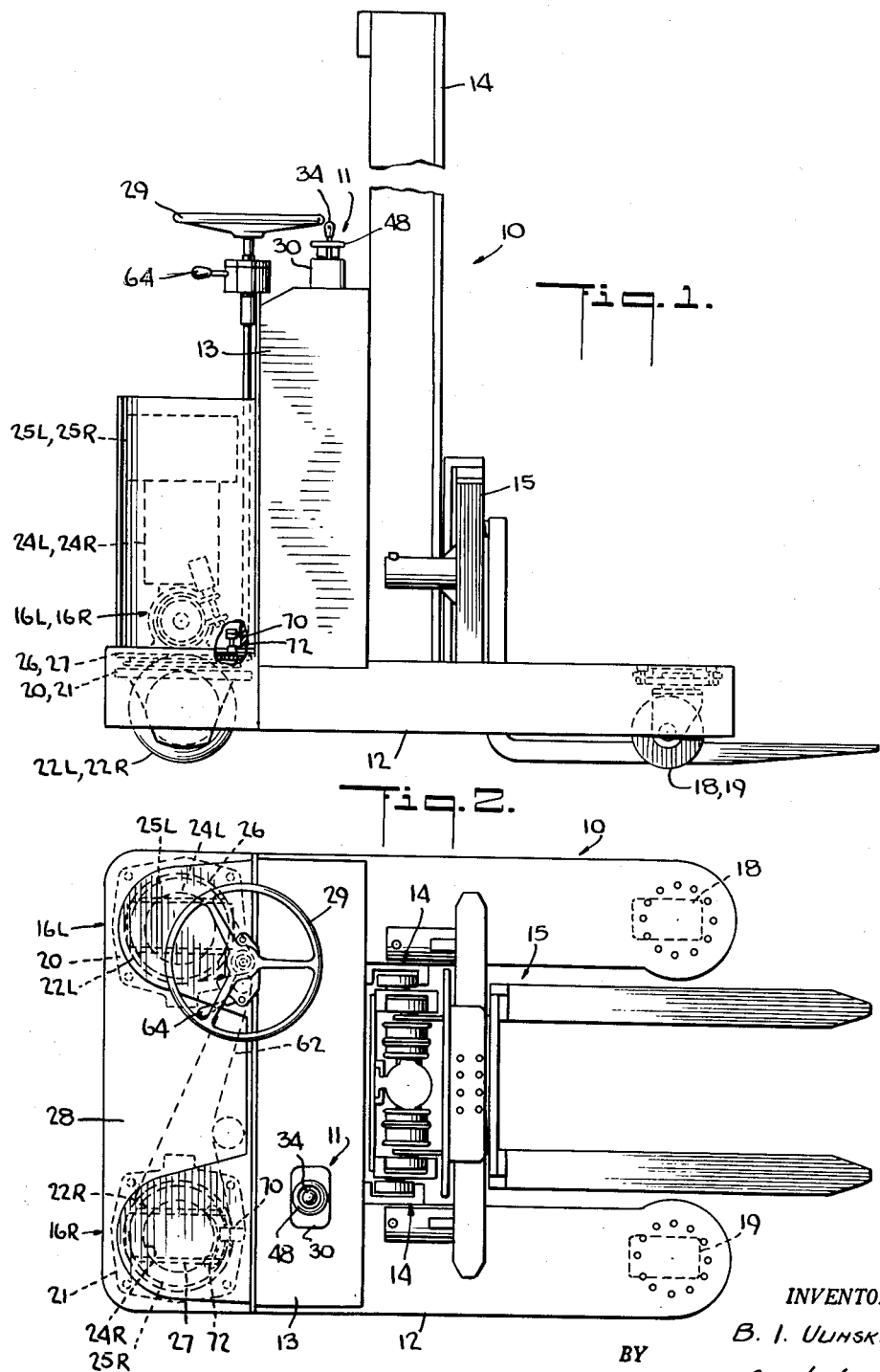
INVENTOR.
B. I. ULINSKI
BY
ATTORNEY

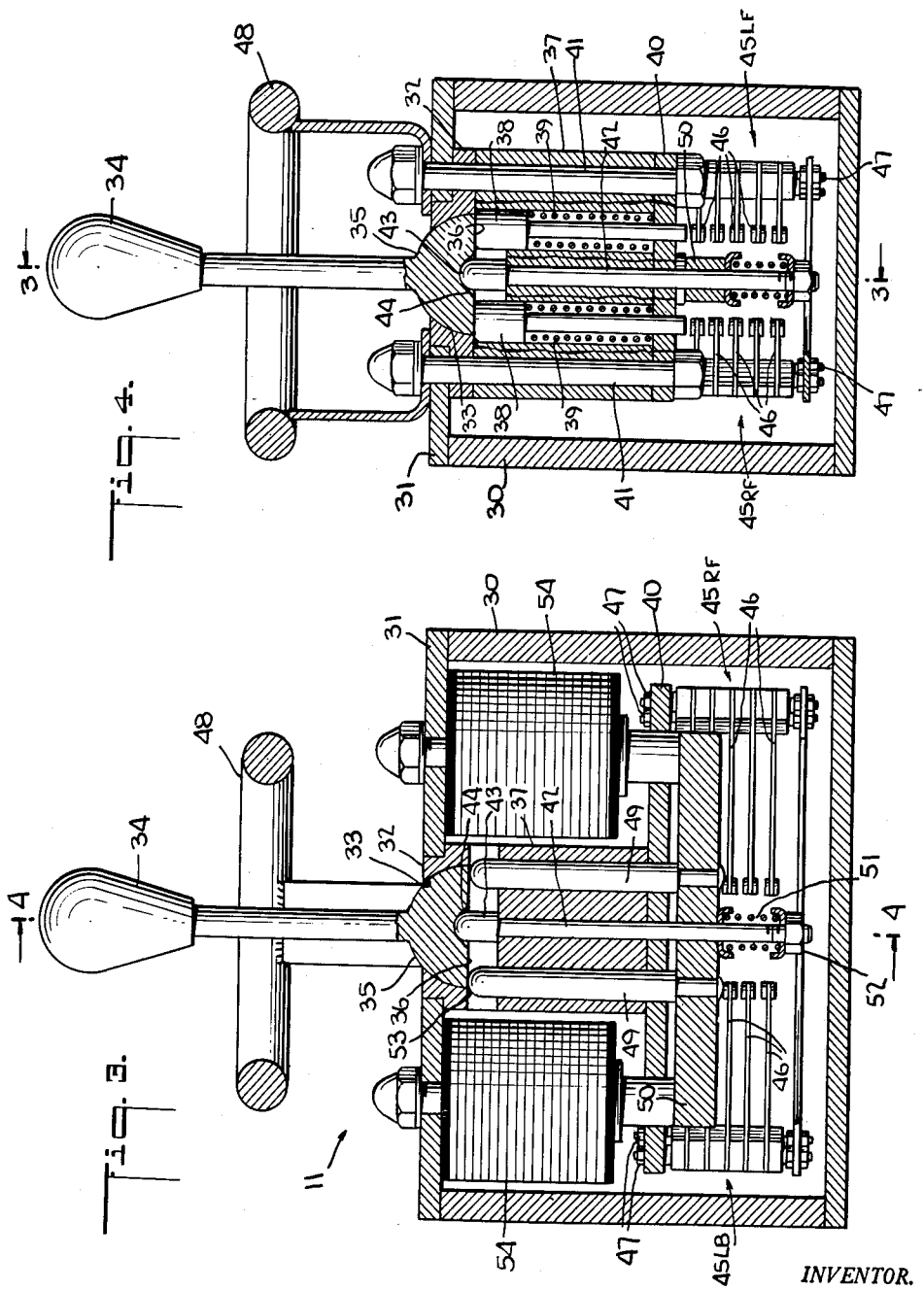

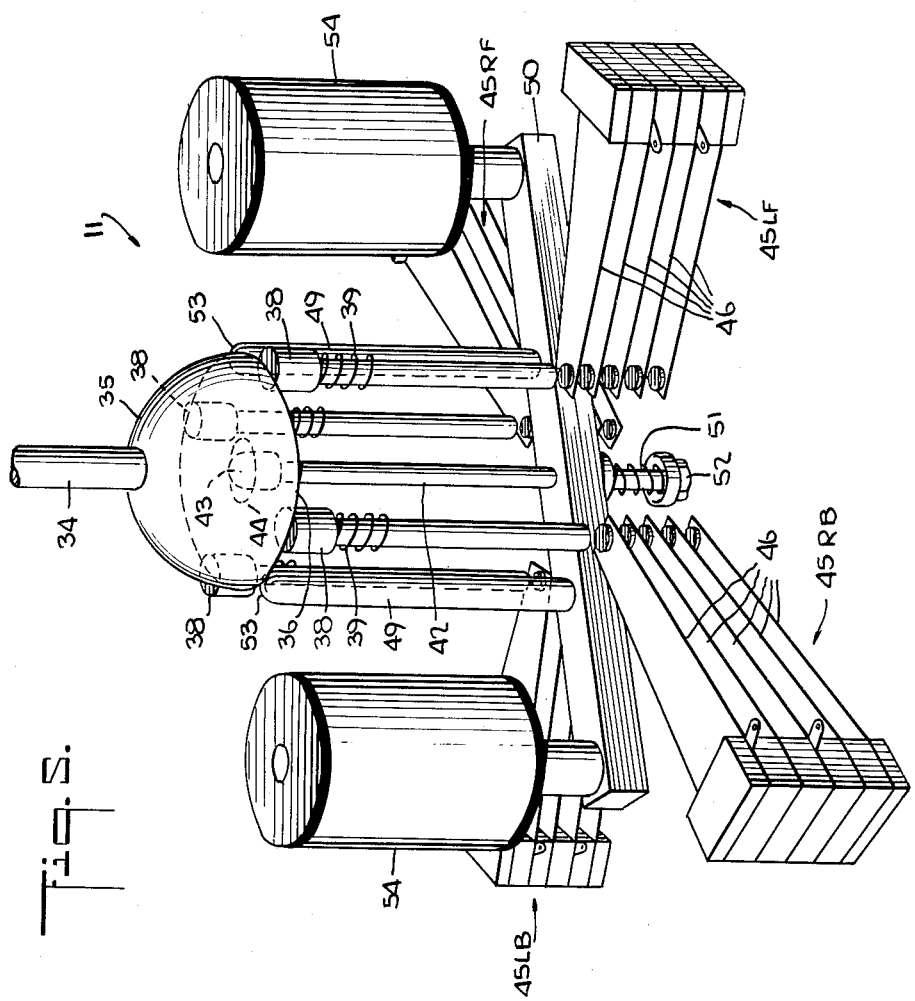

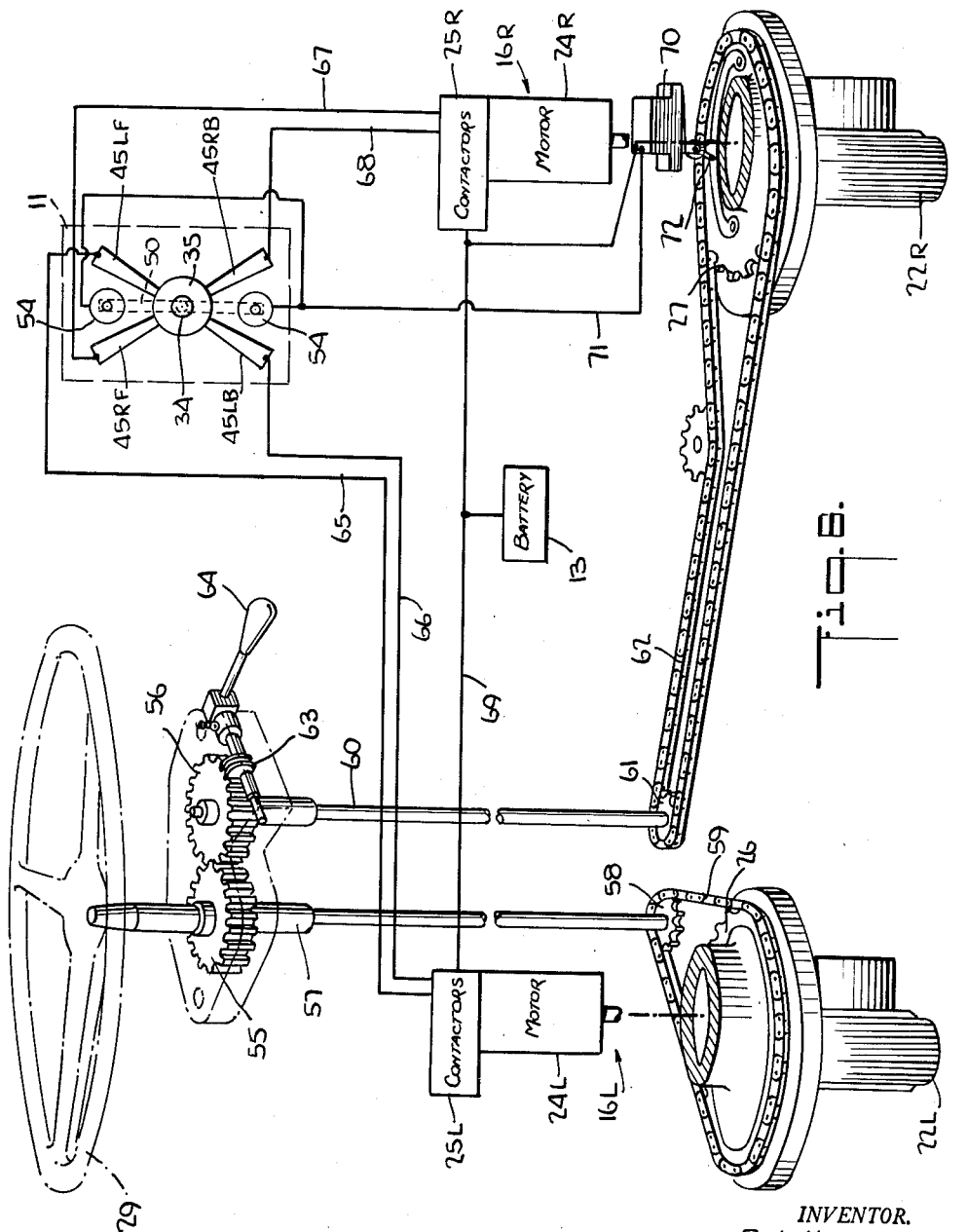

June 26, 1962  B. I. ULINSKI  3,040,827
DRIVE STEERING FOR INDUSTRIAL TRUCK
Filed May 9, 1960  5 Sheets-Sheet 5
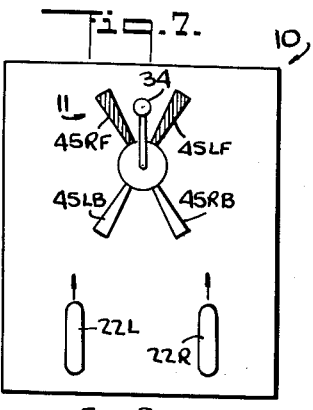
Fig. 7. — FWD. DRIVE
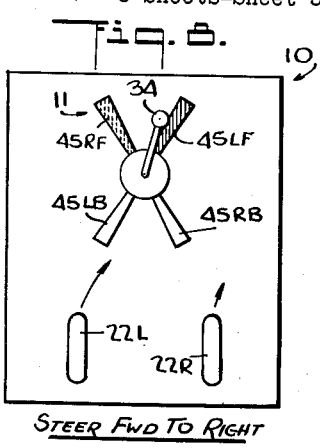
Fig. 8. — STEER FWD TO RIGHT
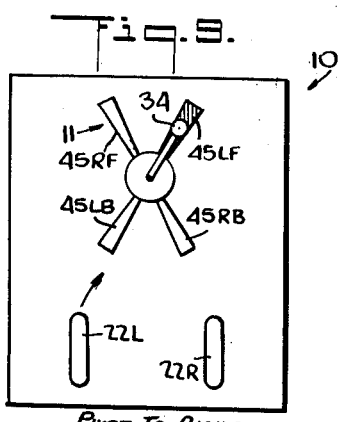
Fig. 9. — PIVOT TO RIGHT
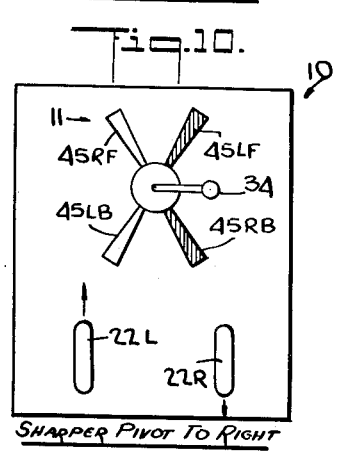
Fig. 10. — SHARPER PIVOT TO RIGHT
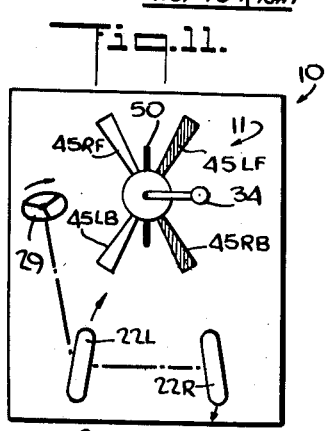
Fig. 11. — SWING TO RIGHT
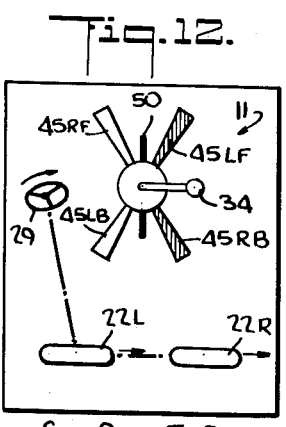
Fig. 12. — SIDE DRIVE TO RIGHT
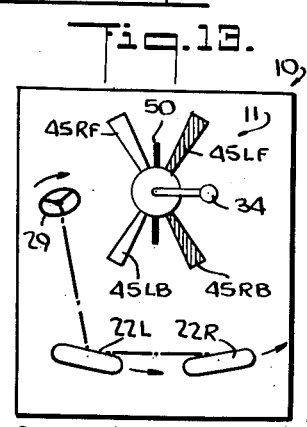
Fig. 13. — STEERING SIDE DRIVE TO RIGHT
INVENTOR.
B. I. ULINSKI
BY
ATTORNEY 3,040,827
Patented June 26, 1962

3,040,827
DRIVE STEERING FOR INDUSTRIAL TRUCK
Bronislaus I. Ulinski, Flossmoor, Ill., assignor to The Yale & Towne Manufacturing Company, Stamford, Conn., a corporation of Connecticut
Filed May 9, 1960, Ser. No. 27,589
18 Claims. (Cl. 180—6.5)

This invention relates to an industrial truck and more particularly, to an industrial truck that is capable of extremely intricate maneuvering so as to handle loads in crowded warehouses in which there may be a minimum of aisle width and an excessive number of obstructions such as pillars and the like. Still more particularly, my invention relates to a truck having a pair of individually operated steering and traction units together with a single controller that is adapted to control the direcion and drive of each of the steering and traction units both when those steering and traction units are locked against steering rotation and when they are adapted for steering rotation in opposed directions.

The concept of my invention is particularly an improvement over that structure set forth in my earlier application, Serial No. 828,976, filed July 23, 1959.

In the combination of my invention, a single universally movable handle is adapted when moved in a forward direction in a plane aligned with the longitudinal axis of the truck, to effect forward actuation of the two steering and traction motors at the same speed. When the handle is moved in a plane angular to said forward direction, there is an appropriate change of speed relatively to one another of the two traction motors so that one wheel rotates faster than the other, thereby swinging the truck toward the right or left, as the case may be, into a direction determined initially by the plane of said handle movement. The controller handle may, when moved to the left or to the right in a plane transverse of the truck, effect the operation of the traction motors in opposed directions so that the truck will turn very sharply about its own axis. Because the controller handle can swing from a central position in any plane, it exercises precise control of direction.

As an extremely important and particular feature of my invention, the release of the steering and traction units and the steering thereof, so conditions the controller that thereafter the controller handle is capable only of effecting drive of the two motors in opposed directions and at the exact same speed. This simplifies sidewise driving since the truck will move in the direction the controller handle is moved, with appropriate steering by the steering apparatus.

As a further particular feature of this part of the invention, the control means need comprise merely a device for compelling movement of the universally movable handle in a particular plane or direction, thereby insuring actuation of the drive motors in the desired directions and at the desired same speed.

Even more particularly, the controller operation is very simply contributed by having the single handle operate any one, or an adjacent pair of plungers, or the like, which plungers or the like, are in turn adapted to close speed circuits. The plungers are so arranged relatively to the controller handle that one plunger may be moved fully and alone, or to a greater degree than the adjacent operated plunger, thereby causing one motor to operate alone, or at a greater speed than the other with a consequent swinging of the truck. The ability to drive one motor under full control and at any speed is of considerable importance. The operation of any two adjacent controller means is also of extreme importance.

In the drawings:

FIG. 1 shows an industrial truck embodying my invention;
FIG. 2 shows a plan view of the truck;
FIG. 3 is an enlarged section on the line 3—3 in FIG. 4, showing the construction of my novel controller.
FIG. 4 shows a section on the line 4—4 in FIG. 3;
FIG. 5 shows a perspective side view of parts of my controller;
FIG. 6 is a view which is partly diagrammatic showing the arrangement of my steering and driving controls;
FIG. 7 shows diagrammatically the operation of my controller to effect forward drive of the truck;
FIG. 8 is similar to FIG. 7 but with the truck steered forwardly to the right;
FIG. 9 indicates the operation when pivoting the truck to the right;
FIG. 10 shows sharper pivoting to the right;
FIG. 11 indicates the operation of the controller and steering wheel to effect a wider swing to the right;
FIG. 12 shows the driving of the truck in a direct sidewise line to the right;
FIG. 13 indicates a position of the controls for driving sidewise to the right, but with the truck steered to the left to a direct sidewise line.

Referring now more particularly to FIGS. 1 and 2 of the drawings, I indicate my industrial truck generally by the numeral 10, and I show at 11 the novel controller that I utilize for driving the truck. In the construction that I have chosen to illustrate, the industrial truck 10 is much like the one that I show in my earlier application, Serial No. 829,111, having a main frame 12 that supports a rather usual battery compartment 13, and uprights 14 on which moves a load lifting carriage 15.

Also, as shown in FIGS. 1 and 2, the rear end of the truck frame 12 is equipped with a pair of individually powered steering and traction units 16L and 16R, which because of their position I shall call the left hand unit and the right hand unit. The forward end of frame 12 will move on a pair of free-steering casters 18, 19. The steering and traction units 16L and 16R are mounted through bearing assemblies 20, 21 for individual steering rotation on the frame 12. The steering mounting of each unit 16L, 16R may very well be like that shown in Ulinski Patent No. 2,842,216, but details of those mountings are not actually important to an understanding of my invention, and it is merely necessary to know that units 16L, 16R can steer individually. In the units 16L and 16R that I show, there are corresponding steering and traction wheels 22L, 22R (FIG. 6), traction motors 24L, 24R, and steering sprockets 26, 27. Circuit control contactors and resistors for each individual motor 24L, 24R may very well be placed in a compartment on the corresponding unit, as I indicate at 25L, 25R.

In position between the steering and traction units 16L, 16R, the truck frame 12 has a driver's platform 28, FIG. 2. The driver will rotate the steering and traction units 16L, 16R through a steering wheel 29 that is connected to the sprockets 26, 27. He will utilize the controller 11 to control the operation of the traction motors 24L, 24R. I shall describe the steering and driving controls in full detail, but I believe that further details of the remainder of the truck need not be described since they are not important to an understanding of my invention. It is merely necessary to appreciate at this point that the driver can control the truck movements simply through the steering and driving of the two traction wheels 22L, 22R.

It will be best if I now refer to FIGS. 3 to 5 to describe the construction of my novel controller 11. The controller 11 has a casing 30 equipped with a cover 31. A medial part of the cover 31 is formed with an opening in which is a bearing member 32, that bearing member having a spherical lower bearing surface 33 that encircles an opening in the member. I utilize a handle 34 that is assembled in the opening of member 32, the lower end portion 35 of the handle being formed with a spherical surface that is adapted to move universally on the bearing surface 33. The end portion 35 of handle 34 is also formed with a relatively flat lower control surface 36.

Mounted in position below the bearing member 32 is a guide block 37 formed with a series of vertical bores in which slide four controller elements 38, best seen in FIG. 5. The elements 38 are in the form of headed pins, as shown, and are arranged with their heads in position to contact the relatively flat control surface 36 on the handle portion 35 at points that are angularly spaced about the center of handle portion 35. A coil spring 39 encircles a lower reduced portion of each element 38, and acts between the head of that element and a horizontal frame member 40, to press the element 38 upwardly against the control surface 36. The bearing member 32, guide block 37, and frame member 40 are held fixedly assembled to the cover 31, and for the particular purpose, I show bolts 41 in FIGURE 4. Naturally, other means may be used.

A rod 42 is assembled in a bore extending through the guide block 37 and frame member 40, FIGS. 3 and 4, and has a head 43 resting on the block 37. The head 43 is in contact with a surface 44 on the center of handle portion 35 so as to prevent bodily inward movement of the handle 34, while allowing universal pivoting of the handle on the bearing surface 33 of member 32. Thus, by pivoting in one direction or another, the handle 34 will depress one or two of the controller elements 38 varying distances against the pressure of their springs 39. Handle 34 cannot, however, be moved vertically to depress all of the elements 38.

As is best seen in FIG. 5, my controller 11 has four individual contact assemblies, each bearing the numeral 45 combined with a particular letter designation. The letter designations set forth the direction of drive of the traction wheels when particular assemblies 45 are actuated. Thus, assembly 45LB effects backward movement of the left wheel 22L. Assembly 45RF effects forward drive of right wheel 22R. Each of the contact assemblies 45 include a series of conventional spring contacts 46 insulated by spacers, and adapted to be pressed in succession against one another whereby to close several speed circuits successively, as by shorting out resistances, preferably through use of contactors.

I mount each contact assembly 45 in position to be actuated by a corresponding controller element 38, the assemblies 45 preferably being mounted on frame member 40 through bolts 47, as indicated in FIGS. 3 and 4. Therefore, it will be appreciated that the handle 34, when pivoted in different directions, will actuate one or two of the contact assemblies 45 by depressing corresponding elements 38. Also, the speed circuits which are closed by a particular assembly 45 will depend upon the amplitude of the handle movement that depresses the controller element 38 for that assembly. Should the handle 34 be pivoted more toward one of the elements 38 than another, the handle may effect closing of a relatively high speed circuit through one assembly 45, and a lower speed circuit through another assembly 45, as will be understood.

Thus, the universal movement of controller handle 34 will enable the truck driver to control simultaneously any two contact assemblies 45 that are adjacent to each other, with those assemblies closing like speed circuits or unlike speed circuits depending on the handle movement. The handle movement also will allow the driver to actuate each assembly 45 individually, as I have already emphasized. The truck driver may control the universal movement of handle 34 more easily by resting his hand upon a circular rest 48 that I prefer to mount on casing 30, as shown in FIGS. 1, 2, 3 and 4.

I now call attention to the fact that my controller 11 has a pair of locking rods 49 mounted to slide in vertical bores in guide block 37, as shown in FIG. 3. Rods 49 are controlled through a vertically movable bar 50 that is positioned below the fixed frame member 40, that bar 50 preferably being mounted to slide on the rod 42, and pressed upwardly through a coil spring 51 that is assembled between the bar 50 and a nut 52 on rod 42. Thereby end surfaces 53 on the rods 49 are yieldingly pressed against the relatively flat control surface 36 on the lower end 35 of handle 34. As may be understood when considering FIG. 3 with FIG. 5, the points of contact between surfaces 53 on rods 49 and control surface 36 are particularly arranged in a line that extends longitudinally of the controller casing 30 and the truck 10, and in a line central of the opposed pairs of the controller elements 38.

The upward spring pressure of bar 50 and rods 49 will tend to hold the handle 34 lightly in its neutral vertical position, as do controller elements 38, but will not prevent the universal pivoting of handle 34. However, I equip my controller 11 with a pair of solenoids 54, FIGS. 3 and 5, that are adapted to exert considerable upward pressure on the rods 49 so as to control the pivoting of handle 34. Solenoids 54 are mounted on the cover 31 in aligned relation to parts of the bar 50, and when energized will hold the bar 50 so that the locking rods 49 cannot be moved downwardly except with abnormal effort. Thereby solenoids 54, bar 50 and rods 49 comprise detent means that are actuated to hold the handle 34 locked, in effect, against pivoting longitudinally of the controller casing 30 and the truck 10. Handle 34 can then pivot sidewise only of the controller and the truck, or in other words, in a direction transverse to the plane of the section of FIGURE 3. The center of that sidewise pivoting of handle 34 will, in effect, be a line determined by the points of contact between the control surface 36, and the end surfaces 53 on the two locking rods 49. By so pivoting, the handle 34 will depress through equal distances either the two controller elements 38 that are arranged at one side of the rods 49, or the two elements 38 at the other side of those rods 49.

Thus, when solenoids 54 are energized, the controller handle 34 can move sidewise only to depress simultaneously the two elements 38 that actuate the two contact assemblies designated in FIG. 5 as 45LF and 45RB, or alternatively, the elements 38 that actuate the two assemblies designated 45RF and 45LB. Moreover, since the two elements 38 that are moved will be depressed equal distances, those elements will effect equal actuation of their corresponding contact assemblies. For example, when two elements 38 move to actuate the assemblies 45LF and 45RB, those elements will first move certain spring contacts 46 in each assembly 45LF and 45RB to close simultaneously a first speed circuit through each of those assemblies. Further movement of the particular elements 38 will move further contacts 46 to close simultaneously a second speed circuit through each assembly 45LF and 45RB, and so forth. Of course, this is the operation of my controller when the solenoids 54 are energized, and it should be remembered that the handle 34 can actuate each assembly 45 individually when the solenoids 54 are not energized.

As I have indicated earlier in this specification, the movements of my truck can be controlled by one controller working with or without the steering apparatus. Thus, when the steering and traction units 16L, 16R are held fixed in aligned positions, so as not to be steered, the driving of one traction wheel 22L or 22R at a greater speed than the other traction wheel will steer the truck in one direction or the other. Also, the driving of one traction wheel in one direction accompanied by the driving of the other traction wheel in a reverse direction then will effect even sharper steering or pivoting of the truck.

Presently I shall explain more in detail how the controller handle 34 will be moved to effect the type of steering I have just outlined. I wish to emphasize, however, that the controller of my invention is particularly adapted also to synchronize the driving control of both traction wheels 22L, 22R for cooperation with the manual steering wheel 29, when that steering wheel is used to steer the truck 10 through rotation of the two independently mounted steering and traction units 16L, 16R. In other words, the very same controller that is adapted to steer the truck through control of the drive and speed of the traction wheels 22L, 22R, is very well adapted also to control the drive when the truck is steered through the manual steering wheel 29. This enables the truck driver to control the truck more simply when driving in both longitudinal and sidewise directions, and will be better understood as my description proceeds.

In FIGURE 6, I show particularly the mounting of the two steering and traction units 16L, 16R, and the means for effecting steering thereof. The steering mechanism is arranged so that the steering and traction units may be locked against rotation, whereupon the sole means for steering the truck is the controller 11 operated by the handle 34. Alternatively, the steering mechanism may be released for operation whereupon the two steering and traction units 16L, 16R may be rotated so as to contribute that type of steering which is most desirable when the truck moves sidewise. Actually, one steering and traction unit will then be rotated in one direction, and the other steering and traction unit will be rotated in the opposed direction. With the steering and traction units 16L, 16R so steering, my controller 11 is adapted to effect simultaneous drive of both traction wheels in the direction that is necessary, and at the same speed. This adaptation of the controller is effected through the detent means comprising the bar 50 and the solenoids 54, already described.

I shall now describe the construction of the steering mechanism, and shall thereafter describe the relationship between the steering mechanism and my controller 11 whereby my controller will cooperate in a novel way with the steering mechanism. Those skilled in the art will appreciate that this novel cooperation, including dual utilization of my controller to steer through actuation of the traction motors, or to allow side steering and side drive control, is an extremely important contribution.

Referring again to FIG. 6, steering wheel 29 acts directly through a shaft 57 to rotate a sprocket 58 that drives sprocket 26 through a chain 59 to rotate steering and traction unit 16L. Gear 55 drives directly a gear 56 secured to a shaft 60 on which is a sprocket 61 that acts through a chain 62 to rotate sprocket 27 for steering unit 16R. The effect of this arrangement is to effect steering rotation of the two steering and traction units in opposed directions when steered by wheel 29.

I mount a locking dog 63 in position to coact with the gear 56, that dog being actuated through a handle 64 so as to enable the truck driver to lock the steering when the wheels 22L, 22R are in positions aligned longitudinally of the truck. The truck is then not steerable by wheel 29.

As is indicated diagrammatically in FIG. 6, I utilize the contact assembly 45LF to control the driving of the left-hand steering and traction unit 16L in a forward direction, that assembly being connected through a cable 65 to contactors 25L. Contact assembly 45LB is similarly connected through cable 66 to contactors 25L to control backward driving of left-hand steering and traction unit 16L. I connect contact assembly 45RF through a cable 67 to contactors 25R to control unit 16R for forward driving, while connecting assembly 45RB through cable 68 to contactors 25R to control backward driving of unit 16R. The battery 13 will supply power to the system, as through cable 69 connected to the contactors 25L, 25R.

At this point I call particular attention to the fact that I arrange my controller 11 in such a position on the truck that the contact assemblies 45RF and 45LF will be actuated when the truck driver moves the controller handle 34 forwardly in alignment with the longitudinal axis of the truck. The truck then drives forwardly. However, contact assembly 45RF is at the left of assembly 45LF, as related to the truck driver. Therefore, it will be understood that the driver can steer the truck to the left or right by moving handle 34 in a corresponding direction relatively to the truck. This is most important.

Rearward drive of the truck will be effected through rearward movement of the handle 34 in the longitudinal axis of the truck, and with the handle held in the longitudinal axis, both traction wheels will be driven at the same speed through actuation of contact assemblies 45LB and 45RB. At this point it should be noted very clearly that contacts 45LB are in longitudinal alignment with contacts 45RF and that contacts 45RB are in alignment with contacts 45LF. Therefore, should the driver wish to steer the truck with the traction units locked against steering, he will have to manipulate his controller handle 34 in a manner different from that manipulation which is required to steer the truck when the truck is moving forwardly. This follows closely the type of steering necessary to "back up" an automobile.

The arrangement of the contacts in the manner set forth is required in order to obtain those results inherent in my concept. Thus, as will be quite apparent, through the arrangement of the contacts 45 as just described, the movement of the handle 34 to the left, in the transverse axis of the truck, will close simultaneously the circuit of the right hand motor in a forwardly direction and the left hand motor in a rearwardly direction so that the truck will turn in its own axis. This very same operation of the controller handle will, as is indicated later, effect simultaneous drive of the two traction units in the same direction and at the exact same speed to permit side drive and side steering in cooperation with the steering apparatus. For this reason, the contact arrangement is of considerable importance.

Referring now again to FIG. 6 and also to FIGS. 1 and 2, I show a switch 70 mounted on the truck frame and connected to the solenoid coils 54 through a cable 71. The steering and traction unit 16R has a cam 72 that is constructed to hold the switch 70 in a circuit opening position when the truck wheels 22L, 22R are in positions aligned longitudinally of the truck. When the wheels 22L, 22R are steered in either direction away from longitudinally aligned position, cam 72 will effect closing of the circuit through switch 70 and solenoid coils 54, so that those coils will hold the bar 50 and rods 49 in the position shown in FIG. 3.

It will be remembered that this holding action will allow the controller handle 34 to move only in a sidewise direction and transversely of the truck. When pivoted in one direction the handle actuates contact assemblies 45RF and 45LB simultaneously. When pivoted oppositely it actuates assemblies 45LF and 45RB simultaneously. Handle 34 can therefore now be used only to drive the wheels 22L, 22R in opposed directions relatively to each other and at the same speed. It will be remembered, however, that the steering of wheels 22L, 22R by steering wheel 29 can take place only in opposed directions relatively to the truck. Therefore, with those wheels steered somewhat, and driven in opposed directions, the truck 10 will move sidewise in a curve that will depend upon the degree of steering. Should the steering be slight, the truck will pivot nearly in situ. Should the steering align the wheels 22L, 22R transversely of the truck 10, the truck will move directly sidewise. During the sidewise movement of the truck, one of the wheels 22L, 22R will be driving in a reverse direction relatively to its particular steering and traction unit 16L or 16R, but because the units have been steered in opposed directions, both wheels 22L, 22R actually will be driving in the same sidewise direction relatively to the truck. All this will be discussed further hereinafter.

It is important to realize that my novel controller enables the sidewise drive, that I have just described, to be controlled very easily and effectively. Thus, when the wheels 22L, 22R are steered for sidewise drive, the controls are automatically conditioned so that both wheels 22L, 22R must drive in the same direction relatively to the truck, and at the same speed, despite the fact that the motors are actuated in opposed directions. That is because the truck driver then can move the controller handle 34 only in a sidewise direction for driving both wheels 22L, 22R at the same speed, and in predetermined directions. In other words, the driving of both wheels 22L, 22R will be synchronized when the wheels are steered, and neither wheel can oppose the movement of the truck. Moreover, the driver need merely move the controller handle 11 in the sidewise direction in which the truck is to move, while using the manual wheel 29 to steer the truck.

To reach a more complete understanding of the operation of my novel controls, it will be best to refer now to the diagrammatic figures of the drawings, considering first FIGURE 7. We will assume that the truck driver wishes to drive the truck directly forward. The wheels 22L, 22R will be aligned longitudinally of the truck, as shown, and may be locked in that position through the handle 64, FIG. 6. Then the driver need merely move the controller handle 34 forwardly as is indicated in FIG. 7. Handle 34 actuates the contact assemblies 45RF, 45LF, as I have indicated by hatching in FIG. 7, so as to effect forward drive of both wheels 22L, 22R in the direction of the arrows, which is also the direction of alignment of the plane in which handle 34 was moved.

Should the driver wish to steer to the right, he will swing the handle 34 in a plane shown in FIGURE 8. This movement of handle 34 will hold the contact assembly 45LF in a position closing a higher speed circuit than is closed through the assembly 45RF, thus effecting faster forward driving of the left-hand drive wheel 22L. That naturally will steer the truck toward the right, as indicated by the arrows in FIG. 8, in alignment with the plane of swinging of handle 34. It will be appreciated that leftward steering will be achieved in substantially the same way as is described in this and following examples, but with controller handle 34 moved toward the left to actuate the appropriate contacts.

Should the driver wish to pivot the truck about the right-hand wheel 22R, he need merely move the handle 34 further to the right, as is shown in FIGURE 9. Circuits through assembly 45LF now will be closed while circuits through assembly 45RF are open, so that wheel 22L will cause the truck to pivot about wheel 22R, which is now stationary.

Still sharper pivoting may be effected by moving handle 34 at a 90° position at the right as shown in FIGURE 10. That will actuate contact assembly 45LF to drive wheel 22L forwardly, and assembly 45RB to drive wheel 22R backwardly.

Let us now assume that the driver wishes to steer the wheels to obtain a still different type of movement. This movement is effected through rotation of the steering wheel 29, as shown in FIGURE 11, the driver having moved handle 64 to unlock the steering. Controller handle 34 is in the same position as shown in FIGURE 10, but wheels 22L, 22R have been steered so that the truck will pivot about a somewhat different axis, the truck in effect swinging to the right.

It will be observed that the steering of the wheels 22L, 22R in FIGURE 11 has actuated the detent means comprising locking bar 50 in controller 11, that being done through the cam 72 and switch 70, shown in FIGURE 6, so that handle 34 can move only in a transverse plane closing the traction circuits of both units at the same speed. Therefore, the wheels 22L, 22R, when steered at an angle to each other, as shown in FIGURE 11, can be driven only in opposed directions. In effect, however, both wheels 22L, 22R will then act together, and neither wheel will oppose the movement of the other wheel. Perhaps the importance of this will be better appreciated when we consider FIGURE 12.

In FIGURE 12, the manual steering wheel 29 has been rotated to steer both wheels 22L, 22R directly sidewise. In steering to these positions, wheel 22L has moved clockwise, and wheel 22R has moved counter-clockwise. By the movement of handle 34 to the right, as shown in FIGURE 12, contact assembly 45LF still effects driving of wheel 22L in a forward direction relatively to its particular steering and traction unit 16L, so that wheel 22L drives the truck directly to the right. In addition, handle 34 has actuated assembly 45RB to drive the wheel 22R in reverse relatively to its unit 16R. Since unit 16R has been steered counter-clockwise, wheel 22R now drives the truck to the right, as does wheel 22L.

Therefore, when the wheels 22R, 22L are in their sidewise driving positions that are shown in FIGURE 12, those wheels must always drive in the same direction and will so drive. That is because the locking bar 50 effectively prevents any movement of handle 34 in a forward or backward direction. Moreover, handle 34 must now actuate the contact assemblies 45LF, 45RB in unison, so as to effect simultaneous closing of corresponding speed circuits through each of those assemblies. Thereby the driving of both wheels 22L, 22R actually will be synchronized when driving in a sidewise direction.

When the truck is moving sidewise, as is indicated in FIGURE 12, steering will be effected through the wheel 29, as shown in FIGURE 13. Thus, by turning steering wheel 29 in one direction or the other, the truck driver can place the wheels 22L and 22R in angular steering positions so that the truck will move in a curved line to the left or right of its direct sidewise line, as the case may be. Regardless of the steering, the truck driver will know that the driving of both wheels 22L, 22R will be automatically synchronized. There are naturally certain limitations to this control of my steering and controller means. Thus, the operator will learn not to attempt the drive and steering of the truck beyond certain positions. He will also appreciate that for side steer he must first rotate his traction units in the direction shown in FIG. 11 to be able to get full and positive control.

I believe it will now be understood that my invention will enable the driver of an industrial truck to use very simple controls for driving the truck either longitudinally or sidewise, and for actually pivoting the truck. The driver can easily steer the truck, regardless of its direction of movement, and can pivot the truck either in situ or about any desired axis. The novel concept of my invention eables me to simplify the controls while using two steering and traction units on the truck. Those controls can effect independent driving of the two traction units at any speed and in either direction, but will synchronize the driving of both units upon predetermined steering of the units.

Thus the truck will be steered at times through independent driving of the two traction motors. At other times, the steering will be effected by steering the two traction wheels at an angle to each other, but that kind of steering will automatically synchornize the driving of those wheels. It will then be impossible for the truck driver to energize the motors in such a way that one wheel will oppose the movement of the truck. The synchronization extends not merely to the direction of drive, but also to the motor speed, the same speed control being applied to each wheel when the wheels are steered.

My invention also makes possible a controller handle that will be moved in a forward or sidewise direction at any angle, for driving the truck in the corresponding direction. All of these things I accomplish while utilizing two wheels for traction. I believe that the very considerable value of my invention will now be fully appreciated by those skilled in the art.

I now claim:

1. In a truck of the class described, a pair of motorized steering and traction units each having a traction motor and a traction wheel driven by said motor, steering means for rotating said steering and traction units relatively to the truck, controller means for said motors for determining the driving direction and speed of said motors, means operable for moving said controller means whereby to drive either of said motors or both said motors simultaneously in the same or opposed directions at the same or different speeds, and means for controlling the operation of said controller moving means, including a portion that limits operation of the controller moving means except for driving said motors in predetermined related directions at the same speed.

2. In a truck of the class described, a pair of motorized steering and traction units each having a traction motor and a traction wheel driven by said motor, steering means for rotating said steering and traction units relatively to the truck, a handle mounted for universal movement relatively to a central position, controller means actuated by said universally mounted handle when moved forwardly from said central position to effect rotation of both said motors forwardly, and when the handle is moved rearwardly to effect rotation of both motors rearwardly, said handle when moved sidewise toward left or right actuating said controller means to drive said motors in opposed directions, and detent means limiting movement of said handle to one side or the other to compel simultaneous opposed directional driving of said motors.

3. In a truck of the class described, a pair of motorized steering and traction units each having a traction motor and a traction wheel driven by said motor, steering means for rotating said steering and traction units relatively to the truck, a lever mounted for universal movement relatively to a central position, a series of controller elements for controlling the speed and direction of rotation of said motors, certain of said controller elements actuated by said universally mounted lever when moved forwardly from central position to effect rotation of both said motors forwardly, and certain elements acting when the lever is moved rearwardly to effect rotation of both said motors rearwardly, said lever when moved sidewise toward left or right actuating said elements to drive said motors in opposed directions, and detent means for limiting movements of said lever to sidewise direction only so as in effect to compel simultaneous opposed directional driving of said motors.

4. In a truck of the class described, a pair of motorized steering and traction units each having a traction motor and a traction wheel driven by said motor, steering means for rotating said steering and traction units relatively to the truck, a lever mounted for universal movement relatively to a central position, a series of four controller elements spaced for actuation singly or in pairs, there being two elements for each motor with one actuated for driving the motor forwardly and the other actuated for driving that motor rearwardly at varying speeds, means actuated by said universally mounted lever when moved forwardly from central position to actuate two of said elements to effect rotation of both said motors forwardly, and actuating two elements when the lever is moved rearwardly to effect rotation of both motors rearwardly, said lever when moved sidewise toward left or right actuating two of said elements to drive said motors in opposed directions, and detent means for limiting movements of said lever to sidewise direction only so as in effect to compel simultaneous opposed directional driving of said motors.

5. In a truck of the class described, a pair of motorized steering and traction units each having a traction motor and a traction wheel driven by said motor, steering means for rotating said steering and traction units relatively to the truck, a lever mounted for universal movement relatively to a central position, a series of four controller elements spaced for actuation singly or in pairs, there being two elements for each motor with one actuated for driving the motor forwardly and the other actuated for driving that motor rearwardly at varying speeds, means actuated by said universally mounted lever when moved forwardly from central position to actuate two of said elements to effect rotation of both said motors forwardly, and actuating two elements when the lever is moved rearwardly to effect rotation of both motors rearwardly, said lever when moved sidewise toward left or right actuating two of said elements to drive said motors in opposed directions, the movement of said lever in an angular direction being adapted to operate but one element to drive but one motor in a particular direction, and detent means for limiting movements of said lever to sidewise direction only so as in effect to compel simultaneous opposed directional driving of said motors.

6. In a truck of the class described, a pair of motorized steering and traction units each having a traction motor and a traction wheel driven by said motor, steering means for rotating said steering and traction units relatively to the truck, means for locking said steering and traction units against steering, controller means movable for driving one of said motors in either of opposed directions with the other motor de-energized and for driving said other motor in either the same direction as said one motor or in the opposed direction, and control means actuated incidental to the release and steering of said traction units, including means limiting the movements of said controller means to a direction effecting simultaneous opposed directional driving of said motors.

7. In a truck of the class described, a pair of motorized steering and traction units individually mounted for steering rotation and having each a traction motor and a traction wheel driven by said motor, means for locking said steering and traction units in positions steering longitudinally of the truck, steering means effective when the units are not locked for rotating said steering and traction units in opposed directions whereby to steer the truck in a sidewise direction, controller means movable for driving one of said motors in either of opposed directions with the other motor de-energized and for driving said other motor in either the same direction as said one motor or in the opposed direction, and control means actuated incidental to the release and steering of said traction units at an angle to their longitudinal steering positions, including means limiting the movements of said controller means to a direction effecting simultaneous opposed directional driving of said motors, so that the wheels will in effect be driven in the same direction while steering the truck sidewise.

8. In a truck of the class described, a pair of motorized steering and traction units each having a traction motor and a traction wheel driven by said motor, steering means for rotating said steering and traction units relatively to positions steering longitudinally of the truck, controller means movable for driving one of said motors in either of opposed directions with the other motor de-energized and for driving said other motor in either the same direction as said one motor or in the opposed direction, and control means actuated by the steering of said traction units, including means limiting the movements of said controller means to a direction effecting simultaneous opposed directional driving of said motors while the units are steered away from their longitudinal steering positions.

9. In a truck of the class described, a pair of motorized steering and traction units each having a traction motor and a traction wheel driven by said motor, controller means movable for controlling each traction motor independently, steering means for rotating said steering and traction units relatively to predetermined steering positions on the truck, and control means actuated by the steering means that rotate said traction units, including means coacting with said controller means to synchronize the control of both traction motors when the units are steered at an angle to said predetermined positions.

10. In a truck of the class described, two steering and traction units individually mounted for steering rotation relatively to the truck, steering means for rotating said steering and traction units on their mountings, means for locking said steering and traction units in predetermined steering positions, controller means for said steering and traction units to determine the speed and direction of drive of each unit independently of the other, and control means actuated incidental to the release and the steering of said units, including means synchronizing the driving control that the controller means apply to both steering and traction units while those units are steered at an angle to said predetermined positions.

11. In a truck of the class described, a pair of motorized steering and traction units each having a traction motor and a traction wheel driven by said motor, steering apparatus, means adapted for locking said steering and traction units against steering rotation, means whereby said steering apparatus steers said steering and traction units in opposed directions when released, a controller having a universally mounted handle formed with an operating surface and positioned normally in a central position, said handle being normally movable from said central position on its mounting in any single plane, a series of four movable controller means positioned for contact by said surface and adapted for actuation by said surface, one of said controller means effecting drive of one motor forwardly and one effecting drive of the said motor rearwardly, the third and fourth of said controller means effecting respectively forward and reverse drive of the other motor, said movable controller means being so related to said motors and to said operating surface of said handle that the swinging of said handle on its universal mounting in any single plane actuates through its operating surface any one, or any adjacent two of said controller means, said controller means being so related and positioned relatively to said surface as to effect drive of the truck by said motors in any forward direction parallel to the plane in which said handle is moved forwardly from its central position when said steering and traction units are locked relatively to said truck in a particular position, and means effectively restraining movement of said handle to a plane transverse of said truck when the steering and traction units are released and are steered.

12. In a truck of the class described, a left and right motorized steering and traction unit each having a traction motor and a traction wheel driven by said motor, steering apparatus, means adapted for locking said steering and traction units against steering rotation, means whereby said steering apparatus steers said steering and traction units in opposed directions when released, a controller having a universally mounted handle formed with an operating surface and positioned normally in a central position, a series of four movable controller means positioned for contact by said surface and adapted for actuation by said surface, two of said controller means effective each for driving one of said motors forwardly and positioned at the left and right of said surface and forwardly thereof, the third and fourth of said controller means effective each for reverse driving of one motor and positioned with the reverse drive controller means of the left motor rearwardly of the forward controller means of the right motor and with the right motor reverse drive controller means rearwardly of the left motor forward drive controller means, said movable controller means being so related to said operating surface of said handle that the movement of said handle on its universal mounting actuates through its operating surface any one or any adjacent two of said controller means to effect drive of the truck by said motors in all directions through control of the direction and speed of said motors while said steering and traction units are locked relatively to said truck in a particular position, and means effectively restraining movement of said handle to a plane transverse of said truck when the steering and traction units are released and are steered whereby said controller handle can then effect only the opposed driving of said left and right motors at the same speed.

13. In a truck of the class described, a left and right motorized steering and traction unit each having a traction motor and a traction wheel driven by said motor, steering apparatus, means adapted for locking said steering and traction units against steering rotation, means whereby said steering apparatus steers said steering and traction units in opposed directions when released, a controller having a universally mounted handle formed with operating means and positioned normally in a central position, a series of four movable controller means positioned for actuation by said operating means, two of said controller means effective each for driving one of said motors forwardly and positioned at the left and right relatively to said central position and forwardly thereof, the third and fourth of said controller means effective each for reverse driving of one motor and positioned with the reverse drive controller means of the left motor rearwardly of the forward controller means of the right motor and with the right motor reverse drive controller means rearwardly of the left motor forward drive controller means, said movable controller means being so related to said handle operating means that the movement of said handle on its universal mounting actuates through its operating means any one or any adjacent two of said controller means to effect drive of the truck by said motors in all directions through control of the direction and speed of said motors while said steering and traction units are locked relatively to said truck in a particular position, and mean effectively restraining movement of said handle to a plane transverse of said truck when the steering and traction units are released and are steered whereby said controller handle can then effect only the opposed driving of said left and right motors at the same speed.

14. In a truck of the class described, a pair of motorized steering and traction units each having a traction motor and a traction wheel driven by said motor, steering apparatus, means adapted for locking said steering and traction units against steering rotation, means whereby said steering apparatus steers said steering and traction units in opposed directions when released, a controller having a universally mounted handle formed with operating means and positioned normally in a central position on its mounting, said handle being normally movable on its mounting in any single plane relatively to the controller and said truck, a series of four movable controller means positioned for actuation by said operating means, one of said operating means effecting drive of one motor forwardly and one effecting drive of the said motor rearwardly, the third and fourth of said controller means effecting respectively forward and reverse drive of the other motor, said movable controller means being so related to said motors and to said operating means of said handle that the swinging of said handle on its universal mounting in any single plane actuates through its operating means any one, or any adjacent two of said controller means, said controller means being so related and positioned relatively to said operating means as to effect drive of the truck by said motors in any forward direction parallel to the plane in which said handle is moved forwardly from its central position when said steering and traction units are locked relatively to said truck in a particular position, and means effectively restraining movement of said handle to a plane transverse of said truck when the steering and traction units are released and are steered.

15. In a truck of the class described, a pair of motorized steering and traction units each having a traction motor and a traction wheel driven by said motor, steering means for rotating the steering and traction units in opposed directions relatively to each other, a handle mounted for universal movement relatively to a central position, controller means actuated by said universally mounted handle when moved forwardly from said central position to effect rotation of both said motors forwardly, and when the handle is moved rearwardly to effect rotation of both motors rearwardly, said handle when moved sidewise toward left or right actuating said controller means to drive said motors in opposed directions relatively to each other, and detent means for permitting only said sidewise movement of the handle upon actuation of said steering means whereby both traction wheels rotate in the same direction relatively to the truck when said steering and traction units are rotated in opposed directions.

16. In a truck of the class described, a pair of motorized steering and traction units each having a traction motor and a traction wheel driven by said motor, means including steering means for rotating said steering and traction units in opposed directions relatively to the truck and for holding said steering and traction units against steering movement, a lever mounted for universal movement relatively to a central position, a series of controller elements actuated by said universally mounted lever for controlling the speed and direction of rotation of said motors to drive said traction wheels in the same or opposed directions at the same or different speeds whereby to steer said truck when said steering and traction units are held against steering rotation, and detent means rendered effective when said steering and traction units are rotated in opposed directions for limiting movement of said lever in a direction to compel simultaneous opposed directional driving of said motors at the same speed.

17. In a truck of the class described, a pair of motorized steering and traction units each having a traction motor and a traction wheel driven by said motor, means including steering means for rotating said steering and traction units in opposed directions relatively to the truck and for holding said steering and traction units against steering movement, controller elements for controlling the speed and direction of rotation of said motors to drive said traction wheels in the same or opposed directions at the same or different speeds whereby to steer said truck when said steering and traction units are held against steering rotation, means for operating said controller elements, and detent means rendered effective when said steering and traction units are rotated in opposed directions for conditioning said controller elements for operation to compel simultaneous opposed directional driving of said motors at the same speed.

18. In a truck of the class described having a pair of motorized steering and traction units each equipped with a traction motor and a traction wheel driven by said motor together with means for steering said steering and traction units in opposed directions and for holding said steering and traction units against steering but with the traction wheels in alignment with the longitudinal axis of the truck, there being a controller mechanism operated by a universally movable lever through which controller mechanism will effect drive of said traction wheels by said motors in the same or opposed directions and at the same or different speeds, the improvement that comprises detent means rendered effective when said steering and traction units are rotated in opposed directions relatively to said truck for limiting movement of said universally movable lever in a direction for controlling said motors to drive said traction wheels in the same effective direction relatively to said truck and at the same speed.

References Cited in the file of this patent

UNITED STATES PATENTS

| | | |
|---|---|---|
| 2,391,881 | Clay | Jan. 1, 1946 |
| 2,565,293 | Aydelott et al. | Aug. 21, 1951 |
| 2,732,022 | Lapsley et al. | Jan. 24, 1956 |
| 2,913,063 | Brown | Nov. 17, 1959 |